Aug. 29, 1961 J. A. MARLAND 2,998,113
ONE-WAY CLUTCH
Filed April 28, 1958
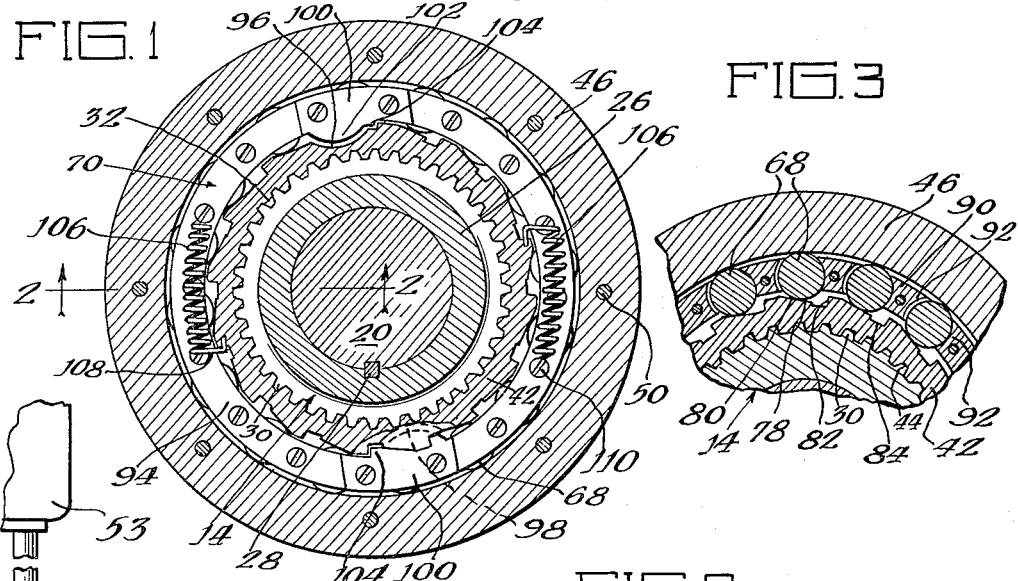
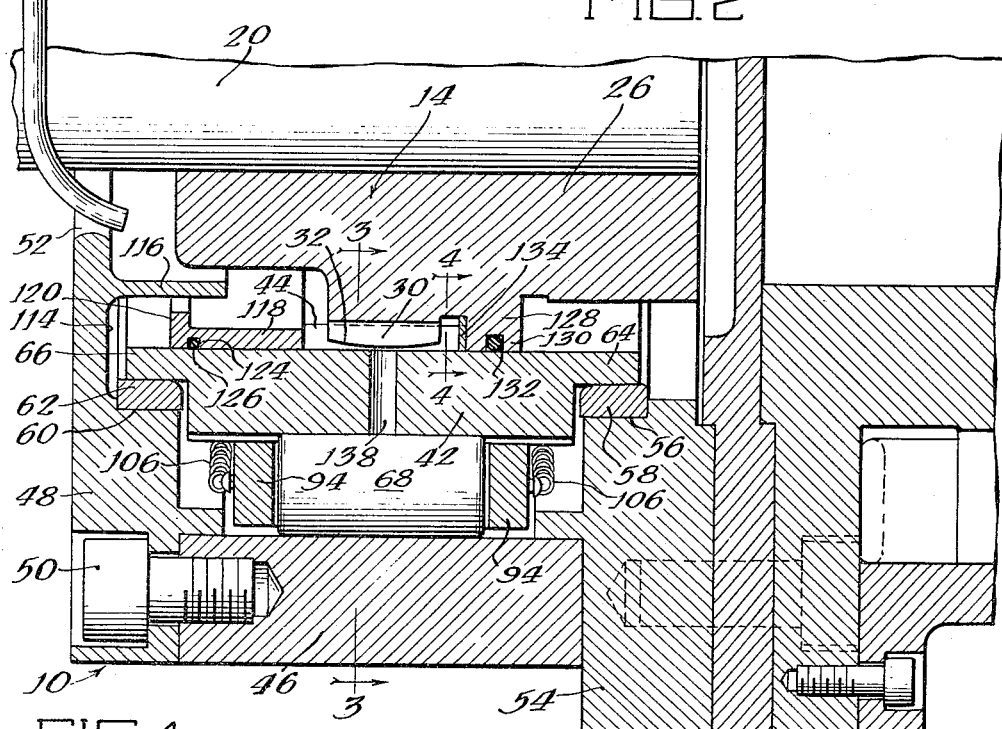
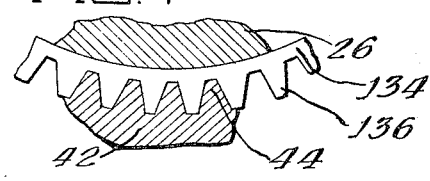
Inventor:
Joseph A. Marland
By: Graf, Nieman & Burmeister
Attorneys United States Patent Office 2,998,113
Patented Aug. 29, 1961

2,998,113
ONE-WAY CLUTCH
Joseph A. Marland, P.O. Box 308, La Grange, Ill.
Filed Apr. 28, 1958, Ser. No. 731,411
8 Claims. (Cl. 192—45)

The present invention relates to one-way clutches, and more particularly to means for lubricating one-way clutches.

One-way clutches are conventionally either of the roller bearing or sprag type. In both types, driving elements or wedges are disposed between coaxially mounted inner and outer races, and the driving elements become wedged between the races when torque is applied in one direction and disengage when torque is applied in the other direction. In the sprag type of clutch, the driving elements are of non-cylindrical form, and the inner and outer races are cylindrical. In the roller type clutch, either the inner or outer race is provided with indentations forming inclined planes, and the rollers rotate in these indentations, becoming wedged between the races for rotational torques in the driving direction.

One-way clutches have found many applications in industry. One of the frequent uses for one-way clutches is in coupling one machine to another where one of the machines is maintained in stand-by condition for at least part of the operation of the other machine. For example, a steam engine may be employed as the prime mover for operating a machine during a summer period when there is sufficient steam to operate the steam engine from a steam generator, and during the winter an electric motor may be employed as the prime mover for driving the machine since the steam generator is inadequate to supply heat as well as drive the machine. Under these circumstances, a one-way clutch is connected between the steam engine and the machine, and a second one-way clutch is connected between the electric motor and the machine. In operation, one of the one-way clutches operates under load while the other one-way clutch free wheels, and these operating conditions may last over a period of months. It is, therefore, one of the objects of the present invention to provide a one-way clutch which has lubrication means for adequately lubricating the clutch whether operated under load or free wheeling for an indefinite period of time.

The inventor's copending patent application, entitled "Transmission," Serial No. 715,437, filed February 14, 1958, discloses a one-way clutch provided with means for compensating for misalignment of the driving and driven shafts connected to the clutch. This compensation means, generally speaking, comprises a first set of gear teeth mounted on the inner surface of the inner race of the one-way clutch and a second set of gear teeth meshed with the first set and adapted to be secured to the shaft of the prime mover or load machine. It has been found that it is difficult to provide adequate lubrication of these gear teeth, and that prolonged operation of the clutch in either the load or the free wheeling condition produces wear on the gear teeth. It is, therefore, a further object of the present invention to provide means for lubricating the shaft alignment compensation means mounted to a one-way clutch.

These and additional objects of the present invention will be readily apparent to those skilled in the art, particularly when viewed in the light of the drawings, in which:

FIGURE 1 is a vertical sectional view of a one-way clutch constructed according to the teachings of the present invention;

FIGURE 2 is a fragmentary sectional view taken along the line 2—2 of FIGURE 1;

FIGURE 3 is a fragmentary sectional view taken along the line 3—3 of FIGURE 2; and FIGURE 4 is a fragmentary sectional view taken along the line 4—4 of FIGURE 2.

The figures illustrate a one-way clutch assembly 10 coupled through a shaft alignment compensating means 14 to a driving machine, not shown, through a shaft 20. The shaft compensation means 14 employs a sleeve 26 which is secured to the shaft 20 and maintained in rotational position by a key 28 disposed between the shaft 20 and the sleeve 26. The periphery of the sleeve 26 is provided with outwardly extending gear teeth 30, and the gear teeth 30 are provided with curved outer edges 32, the edges 32 curving toward the axis of the sleeve 26. The teeth 30 engage the clutch assembly 10.

The clutch assembly 10 has a cylindrical inner race 42 which is provided with teeth 44 on its inner surface which are meshed with the teeth 30 of the sleeve 26. The inner race 42 is rotatably disposed within a cylindrical outer race 46, the outer race 46 forming a portion of the housing of the one-way clutch. A flat ring-shaped cover plate 48 is secured to the edge of the outer race 46 by bolts 50 spaced about the periphery of the cover plate 48, and the cover plate 48 extends close to the shaft 20 leaving an annular opening 52 for the introduction of oil from an oiler 53, as illustrated in FIGURE 2. A flat ring 54 with a smaller inner diameter and larger outer diameter than the outer race 46 is secured normal to the outer race on the side thereof opposite the cover plate 48, and the load machine, not shown, is coupled to this ring 54. The inner surface of the ring 54 is provided with a flat cylindrical surface 56 which engages a cylindrical bushing 58 with a generally rectangular cross-section. The cover plate 48 is also provided with a cylindrical surface 60 aligned with the shoulder 56, and a cylindrical bushing 62 similar to the bushing 58 is mounted on the surface 60. The inner race 42 has flat cylindrical extensions 64 and 66 which abut the bushings 58 and 62, respectively. The edges of the inner race 42 also abut the edges of the bushings 58 and 62, so that the bushings 58 and 62 maintain alignment of the inner race.

In this embodiment of the invention, the drive elements or clutch wedges are in the form of roller bearings 68. The roller bearings 68 are mounted in an assembly 70. The inner race 42 is provided with a plurality of indentations 78 which have two flat surfaces, a leading surface 80 and a trailing surface 82 which is disposed approximately at a right angle relative to the leading surface 80. The leading surface 80 of each indentation 78 is disposed at an angle less than 15 degrees relative to the tangential plane at the intersection of the outer surface of the inner race 42 and the leading surface 80 of the indentation 78. Each of the indentations 78 is also provided with a groove 84 extending across the leading surface 80 of the indentation 78 immediately adjacent to the trailing surface 82 thereof for the purpose of permitting free flow of oil.

One of the bearings 68 is disposed between each indentation 78 of the inner race 42 and the outer race 46. The roller bearings 68 have a diameter larger than the distance between the outer surface of the inner race 42 and the inner surface of the outer race 46, and smaller than the distance between the leading surface 80 of the indentations 78 of the inner race 42 at a distance from the trailing surface 82 of the indentation approximately equal to the radius of the roller bearing to the inner surface of the outer race 46. In this manner, the roller bearings 68 are free to rotate when disposed adjacent to the trailing surface 82 of the indentations 78, but wedge between the inner race 42 and outer race 46 when rolling away from trailing surface 82 of the indentations of the inner race 42.

In the assembly 70, each of the roller bearings 68 is separated from adjacent roller bearings by a cage member 90 which has partially cylindrical surfaces 92 confronting each of the adjacent roller bearings 68 and which conform to the roller bearings. Also, each of the cage members 90 is interconnected at its ends by end rings 94, the end rings 94 and cage members 90 maintaining each of the roller bearings 68 in proper position relative to the inner race 42. The cage members 90 and end rings 94 form a cage for each of the roller bearings 68, so that the roller bearings 68 are free to move only a small distance along radial planes since the concave surfaces 94 of the cage members 90 retain them in position.

The inner race 42 is provided with two pairs of parallel slots 96 and 98. These slots 96 and 98 are disposed parallel to each other in the same indentation 78, respectively, on opposite sides of the outer surface of the inner race 42 normal to the axis of the inner race 42. Also, the slots 96 are disposed in indentations 78 on opposite sides of the axis of the inner race 42 from the slots 98. A stop lug 100 is secured to the roller bearing assembly 70 confronting each of the slots 96 and 98, and the stop lug 100 is provided with an inwardly protruding portion 102 which is slidably accommodated within the slots 96 or 98. In addition, each stop lug 100 is provided with an inwardly protruding tooth 104 which is adapted to abut the trailing edge of the indentation carrying the slot 96 or 98. The slots 96 are thus disposed adjacent to the end rings 94 of the roller bearing assembly 70 at opposite ends of the same roller bearing 68, and the slots 98 are likewise disposed adjacent to the end rings 94 of the same roller bearing 68.

The stop lugs 100 have two functions. When the clutch is operated in the direction of rotation, the teeth 104 of the stop lugs 100 abut the trailing surface 82 of the indentation 78 to limit the distance by which the roller bearings 68 may travel down the inclined planes or leading surfaces of the indentation 78, thus preventing the roller bearings 68 from abutting the trailing surfaces 82 of the indentation 78. In this manner, friction between the trailing surfaces of the indentations and the roller bearings 68 is substantially reduced. Also, since the protruding portions 102 of the stop lugs 100 are disposed within the slots 96, axial motion of the roller bearing assembly 70 relative to the inner race 42 is eliminated, thus assuring alignment of the roller bearing assembly 70 and the inner race 42. Since the roller bearing assembly 70 is in essence keyed to the inner race 42, the only necessary contact between the roller bearing assembly 70 and the outer race 46 is through the roller bearings 68. Hence, friction between the inner and outer races in the direction of rotation is minimized.

A pair of helical springs 106 are disposed on opposite sides of the axis of the inner race 42 on each side thereof to spring bias the roller bearing assembly 70 relative to the inner race 42 toward the locking position in order to insure engagement of the roller bearings 68 between the leading surfaces 80 of the indentations 78 and the outer race 46 when the clutch is in the rest position. The helical springs 106 have one end anchored within a bore 108 in the trailing surface 82 of indentations 78 on opposite sides of the axis of the inner race. The other end of the helical springs 106 is secured about a bolt 110 which is secured to the roller bearing assembly 70. The helical springs 106 form means to bias the rollers toward the intersection of the leading surface 80 and the outer surface of the inner race, and as a result, the "play" between the rest position of the clutch and the lock position of the clutch is greatly reduced.

While the end rings 94 may be secured to the roller cages 90 in any conventional manner, the applicant has found that a simple and very suitable way to accomplish this is to employ the bolts 110 for this purpose. The bolts 110 extend through the end rings 94, and the cage members 90, and are anchored in the end rings 94. In like manner, the bolts 110 may be employed to secure the stop lugs 100 to the roller bearing assembly 70.

The cylindrical extension 66 of the inner race 42 is disposed within an annular indentation 114 on the inner surface of the cover plate 48. A cylindrical portion 116 of the cover plate 48 extends from the indentation 114 coaxially with the shaft 20, and terminates between the sleeve 26 and the inner race 42. A cylindrical lubricant retainer 118 is secured to the inner surface of the inner race 42 and extends from the gear teeth 44 toward the cover plate 48. The retainer 118 has a ring portion 120 extending from the end thereof opposite the gear teeth 44 toward the axis of the shaft 20, and the ring portion 120 extends from the inner surface of the inner race 42 a distance slightly greater than that of the teeth 44 disposed on the inner surface of the inner race 42. The ring portion 120 is disposed between the cylindrical portion 116 of the cover plate 48 and the inner race 42 and spaced from the cylindrical portion 116 of the cover plate 48. The retainer 118 is provided with an annular groove 124 adjacent to the ring portion 120 and confronting the inner race 42. A sealing member 126, in the form of an O-ring, is disposed within the groove 124 and forms a fluid tight seal between the retainer 118 and the inner race 42. The O-ring 126 prevents a liquid lubricant from seeping between the inner race 42 and the retainer 118, and thereby makes it unnecessary in securing these members together to provide a fluid tight seal therebetween.

The sleeve 26 is provided with an annular shoulder 128 which extends toward the inner race 42 on the side of the gear teeth 44 opposite the retainer 118. The surface of the annular shoulder 128 which confronts the inner race 42 is provided with an annular groove 130, and a sealing ring 132, in the form of an O-ring, is disposed within the groove 130 in abutment with the inner race 42 and the sleeve 26. The ring 132 substantially retards leakage of oil from the gear teeth 44 past the shoulder 128.

Thus far, the elements have been described which will provide adequate lubrication of the shaft alignment means and one-way clutch when the unit is operating under load, that is, when the roller bearings 68 lock the inner race 42 to the outer race 46, and the inner and outer races rotate together about the shaft 20. Under these conditions, oil flows from the oiler 53 into the opening 52, thence across the cylindrical portion 116 of the cover plate 48 to the region between the sleeve 26 and the retainer 118. Since the ring portion 120 of the retainer 118 dams up the oil, the oil flows over the gear teeth 44 and 30 providing lubrication of these gear teeth. Further, the annular shoulder 128 and O-ring 132 make it certain that the level of the oil between the oil retainer 118 and the shoulder 128 of the lowest portion of the clutch assembly will be sufficient to cover the gear teeth 44 and 30. Since the unit is constantly rotating, all of the gear teeth 44 and 30 become lubricated.

In its free wheeling condition, the shaft 20 may be stationary, and the outer race 46 rotate about the inner race 42. Under these conditions, the retainer 118 will only lubricate those few gear teeth 44 and 30 disposed at the bottom of the clutch assembly 10 in its rest position. Nevertheless, friction will occur between the gear teeth 44 and 30 of the shaft alignment compensating means 14 during the free wheeling operation. For this reason, a serrated oil retaining washer 134 is disposed abutting the surface of the shoulder 128 confronting the teeth 30 of the sleeve 26, as illustrated in FIGURES 2 and 4. The serrated washer 134 may be constructed of neoprene and has teeth 136 which snugly fit between the teeth 44 disposed on the inner surface of the inner race 42. The serrated washer 134, as well as the O-ring 132 in the shoulder 128, provide a liquid seal preventing the flow of oil from the gear teeth 44 and 30 past the shoulder 128. The improved oil seal afforded by the serrated washer 134 is most desirable in the free wheeling condition to maintain the oil upon the gear teeth 44 and 30.

Oil for the gear teeth 44 and 30 leaks through radial holes 138 in the inner race 42 in the upper portions of the clutch assembly 10. The inner race 42 is provided with a plurality of these radial holes 138 at angular spaced intervals so that a number of these holes will be located in the upper portion of the clutch assembly regardless of the relative angle in which the clutch assembly 10 is disposed to permit oil to drain downwardly from the roller bearing assembly to the gear teeth 44 and 30. This oil will then be free to lubricate those gear teeth 44 and 30 which are located in the upper portions of the machine in the free wheeling operation. The number of the radial holes 138 should, however, be restricted to permit the retainer 118 to dam up oil during load operation.

It is apparent from the foregoing disclosure, that the inventor has provided a novel one-way clutch and shaft alignment compensation means assembly which is provided with adequate lubrication whether under load operation or free wheeling operation. It is further apparent that the present invention is applicable to sprag clutches as well as roller bearing clutches, although it has been illustrated with roller bearings. It is, therefore, intended that the scope of the present invention be not limited by the foregoing disclosure, but rather only by the appended claims.

The invention claimed is:

1. A one-way clutch assembly comprising a generally cylindrical inner race having a cylindrical coaxial opening with a set of gear teeth disposed thereabout parallel to the axis of the inner race, a cylindrical sleeve disposed within the race having a set of outwardly extending gear teeth meshed with the gear teeth of the inner race, the teeth of at least one of said sets having edges curving away from the other set, a cylindrical outer race disposed coaxially about the inner race, a plurality of drive elements disposed between the inner race and outer race, rotational torque applied between the inner and outer races in one direction wedging the drive elements between the races and torque in the other direction releasing the drive elements, means to introduce a liquid lubricant between the sleeve and inner race including a lubricant retainer disposed between the sleeve and inner race on one side of the gear teeth, and a second lubricant retainer mounted on the inner race on the other side of the gear teeth and provided with a ring portion extending toward the axis of the sleeve from the inner race, said ring portion being radially spaced from adjacent surfaces, and the liquid lubricant introducing means directing lubricant between the second lubricant retainer and the gear teeth.

2. A one-way clutch assembly comprising a generally cylindrical inner race having a cylindrical coaxial opening with a set of gear teeth disposed thereabout parallel to the axis of the inner race, a cylindrical sleeve disposed within the inner race having a set of outwardly extending gear teeth meshed with the gear teeth of the inner race and an axial bore for receiving a shaft, the teeth of at least one of said sets having edges curving away from the other set, a cylindrical outer race disposed coaxially about the inner race, a plurality of drive members disposed between the inner and outer races, rotational torque applied between the inner and outer races in one direction wedging the drive elements between the races and torque in the other direction releasing the drive elements, an annular cover plate secured to the outer race and extending toward the axis thereof to a radius greater than that of the bore in the sleeve to form an annular gap confronting the sleeve, said cover plate having a cylindrical portion extending toward the gear teeth coaxially with the bore of the sleeve and spaced from the sleeve and lubrication means including a tube having one end positioned in the annular gap of the cover plate to introduce a liquid lubricant into the space between the cover plate and the bore of the sleeve.

3. A one-way clutch assembly comprising a generally cylindrical inner race having a cylindrical coaxial opening with a set of gear teeth disposed thereabout parallel to the axis of the inner race, a cylindrical sleeve disposed within the inner race having a set of outwardly extending gear teeth meshed with the gear teeth of the inner race and an axial bore for receiving a shaft, the teeth of at least one of said sets having edges curving away from the other set, a cylindrical outer race disposed coaxially about the inner race, a plurality of drive members disposed between the inner and outer races, rotational torque applied between the inner and outer races in one direction wedging the drive elements between the races and torque in the other direction releasing the drive elements, an annular cover plate secured to the outer race and extending toward the axis thereof to a radius greater than that of the bore in the sleeve, said cover plate having a cylindrical portion extending toward the gear teeth coaxially with the bore of the sleeve and spaced from the sleeve, means to introduce a liquid lubricant into the space between the cover plate and the bore of the sleeve, a first lubricant retainer disposed between the sleeve and the inner race on the side of the gears opposite the cover plate, and a second lubricant retainer having a cylindrical portion secured to the inner race between the cover plate and the gears provided with a ring portion extending from the inner race between the inner race and the cylindrical portion of the cover plate, said ring portion confronting the outer surface of the cylindrical portion of the cover plate and being spaced therefrom.

4. A one-way clutch assembly comprising a generally cylindrical inner race having a cylindrical coaxial opening with a set of gear teeth disposed thereabout parallel to the axis of the inner race, a cylindrical sleeve disposed within the inner race having a set of outwardly extending gear teeth meshed with the gear teeth of the inner race and an axial bore for receiving a shaft, the teeth of at least one of said sets having edges curving away from the other set, a cylindrical outer race disposed coaxially about the inner race, a plurality of drive members disposed between the inner and outer races, rotational torque applied between the inner and outer races in one direction wedging the drive elements between the races and torque in the other direction releasing the drive elements, an annular cover plate secured to the outer race and extending toward the axis thereof to a radius greater than that of the bore in the sleeve, said cover plate having a cylindrical portion extending toward the gear teeth coaxially with the bore of the sleeve and spaced from the sleeve, means to introduce a liquid lubricant into the space between the cover plate and the bore of the sleeve, a first lubricant retainer disposed between the sleeve and the inner race on the side of the gears opposite the cover plate, a second lubricant retainer having a cylindrical portion secured to the inner race between the cover plate and the gears provided with a ring portion extending from the inner race between the inner race and the cylindrical portion of the cover plate, said ring portion confronting the outer surface of the cylindrical portion of the cover plate and being spaced therefrom, said second lubricant retainer having a groove extending coaxially about the outer surface thereof confronting the inner race, and a sealing ring disposed in the groove.

5. A one-way clutch assembly comprising the elements of claim 3 wherein the first lubricant retainer comprises an annular protruding shoulder of the sleeve terminating in a surface confronting the inner race on the side of the gears thereof opposite the cover plate, said surface having a groove therein extending coaxially about the inner race, and the first lubricant retainer comprises a sealing ring disposed in the groove and abutting the inner race.

6. A one-way clutch assembly comprising the elements of claim 3 wherein the first lubricant retainer comprises an annular protruding shoulder of the sleeve terminating in a surface confronting the inner race on the side of the gears thereof opposite the cover plate, and the first sealing means comprises a splined ring gasket disposed about the set of gear teeth of the inner race, said gasket having teeth disposed between and abutting the teeth of the set of gear teeth, said gasket abutting the shoulder of the sleeve.

7. A one-way clutch assembly comprising a generally cylindrical inner race having a cylindrical coaxial opening with a set of gear teeth disposed thereabout parallel to the axis of the inner race, said inner race being provided with a plurality of channels spaced about its circumference extending therethrough confronting the gear teeth thereof, a cylindrical sleeve disposed within the inner race having a set of outwardly extending gear teeth meshed with the gear teeth of the inner race and an axial bore for receiving a shaft, the teeth of at least one of said sets having edges curving away from the other set, a cylindrical outer race disposed coaxially about the inner race, a plurality of drive members disposed between the inner and outer races, rotational torque applied between the inner and outer races in one direction wedging the drive elements between the races and torque in the other direction releasing the drive elements, an annular cover plate secured to the outer race and extending toward the axis thereof to a radius greater than that of the bore in the sleeve, said cover plate having a cylindrical portion extending toward the gear teeth coaxially with the bore of the sleeve and spaced from the sleeve, means to introduce a liquid lubricant into the space between the cover plate and the bore of the sleeve, a first lubricant retainer disposed between the sleeve and the inner race on the side of the gears opposite the cover plate, and a second lubricant retainer having a cylindrical portion secured to the inner race between the cover plate and the gears provided with a ring portion extending from the inner race between the inner race and the cylindrical portion of the cover plate, said ring portion confronting the outer surface of the cylindrical portion of the cover plate and being spaced therefrom.

8. A one-way clutch assembly comprising a generally cylindrical inner race having a cylindrical coaxial opening with a set of gear teeth disposed thereabout parallel to the axis of the inner race, said inner race being provided with a plurality of channels spaced about its circumference extending therethrough confronting the gear teeth thereof, a cylindrical sleeve disposed within the inner race having a set of outwardly extending gear teeth meshed with the gear teeth of the inner race and an axial bore for receiving a shaft, the teeth of at least one of said sets having edges curving away from the other set, said sleeve having an annular protruding shoulder terminating in a surface confronting the inner race on the side of the gears thereof opposite the cover plate, said surface being provided with an annular groove, a cylindrical outer race disposed coaxially about the inner race, a plurality of drive members disposed between the inner and outer races, rotational torque applied between the inner and outer races in one direction wedging the drive elements between the races and torque in the other direction releasing the drive elements, an annular cover plate secured to the outer race and extending toward the axis thereof to a radius greater than that of the bore in the sleeve, said cover plate having a cylindrical portion extending toward the gear teeth coaxially with the bore of the sleeve and spaced from the sleeve, means to introduce a liquid lubricant into the space between the cover plate and the bore of the sleeve, a sealing ring disposed in the groove of the shoulder abutting the sleeve and the inner race on the side of the gears opposite the cover plate, and a second lubricant retainer having a cylindrical portion secured to the inner race between the cover plate and the gears provided with a ring portion extending from the inner race and the cylindrical portion of the cover plate, said ring portion confronting the outer surface of the cylindrical portion of the cover plate and being spaced therefrom, and a splined ring gasket disposed about the set of gear teeth of the inner race, said gasket having teeth disposed between and abutting the teeth of the set, said gasket abutting the shoulder of the sleeve.

References Cited in the file of this patent

UNITED STATES PATENTS

| | | |
|---|---|---|
| 2,082,842 | Marland | June 8, 1937 |
| 2,172,653 | Flogaus | Sept. 12, 1939 |
| 2,286,862 | Livingston | June 16, 1942 |
| 2,389,961 | Dodge | Nov. 27, 1945 |
| 2,726,523 | Zrodowski | Dec. 13, 1955 |
| 2,842,945 | Swanson | July 10, 1958 |